United States Patent
Fujiwara et al.

(10) Patent No.: US 8,002,483 B2
(45) Date of Patent: Aug. 23, 2011

(54) PHOTOGRAPHIC DEVICE AND CAMERA BODY HAVING RECTANGULAR SHAPED OPENING, LENS BARREL ATTACHED TO THE SAME, AND PRODUCTION METHOD OF THE PHOTOGRAPHIC DEVICE AND THE LENS BARREL

(75) Inventors: Makoto Fujiwara, Yokohama (JP); Yuuichi Katagishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 508 days.

(21) Appl. No.: 11/724,191

(22) Filed: Mar. 15, 2007

(65) Prior Publication Data

US 2007/0217785 A1    Sep. 20, 2007

(30) Foreign Application Priority Data

Mar. 17, 2006 (JP) .................. 2006-074685

(51) Int. Cl.
 G03B 17/02 (2006.01)
 G03B 17/00 (2006.01)
(52) U.S. Cl. ......... 396/531; 396/530; 359/828; 359/819
(58) Field of Classification Search .................. 396/531; 359/828
 See application file for complete search history.

(56) References Cited

U.S. PATENT DOCUMENTS

| | | | | | |
|---|---|---|---|---|---|
| 4,118,713 | A | * | 10/1978 | Murakami et al. | 396/227 |
| 4,620,780 | A | * | 11/1986 | Maekawa et al. | 396/532 |
| 4,748,467 | A | * | 5/1988 | Maekawa et al. | 396/532 |
| 5,041,858 | A | * | 8/1991 | Yamamichi et al. | 396/532 |
| 5,359,379 | A | * | 10/1994 | Kohno et al. | 396/80 |
| 5,640,223 | A | * | 6/1997 | Taniguchi et al. | 396/532 |
| 5,761,560 | A | * | 6/1998 | Miyazawa et al. | 396/532 |
| 2004/0252991 | A1 | | 12/2004 | Kawai et al. | |

FOREIGN PATENT DOCUMENTS

GB    2 187 856 A    9/1987
JP    A-2000-121904    4/2000

OTHER PUBLICATIONS

Anonymous, "Lens Mount" [online]; Jun. 20, 2007; Wikipedia; URL: <http://en.wikipedia.org/wiki/Lens_mount>; [retrieved on Jun. 20, 2007].

* cited by examiner

*Primary Examiner* — W. B. Perkey
*Assistant Examiner* — Bret Adams
(74) *Attorney, Agent, or Firm* — Oliff & Berridge, PLC

(57) ABSTRACT

A lens barrel comprising bayonet type mount projections to detachably attach to a lens-fitting unit of a camera body having a photographic region, wherein mount projections are formed to avoid cross-section of light path area where object light is introduced in the camera body.

26 Claims, 12 Drawing Sheets

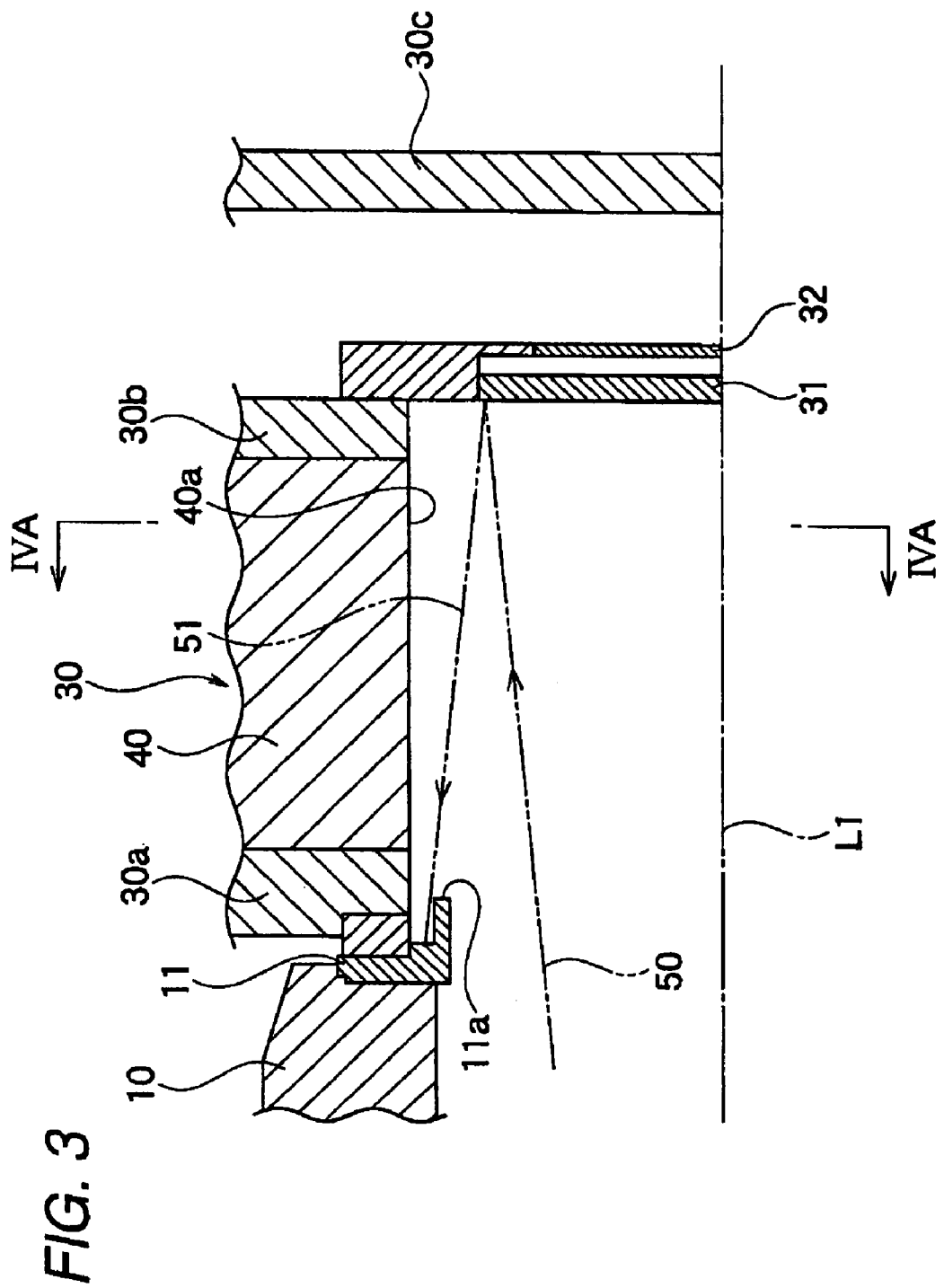

PHOTOGRAPHIC DEVICE AND CAMERA BODY HAVING RECTANGULAR SHAPED OPENING, LENS BARREL ATTACHED TO THE SAME, AND PRODUCTION METHOD OF THE PHOTOGRAPHIC DEVICE AND THE LENS BARREL

BACKGROUND OF THE INVENTION

1. Field of the Invention

The present invention relates to a lens barrel, a photographic device and production methods of the lens barrel and the photographic device.

2. Description of the Related Art

In the Japanese Unexamined Patent Publication (A) No. 2000-121904, a lens barrel is proposed to enable to change a diaphragm to cut off harmful rays in accordance with the size of the image circle. However, a prior lens barrel cannot reduce effects of catoptric light due to bayonet mounts.

SUMMARY OF THE INVENTION

An object of the present invention is to provide a lens barrel and a camera system enabling to reduce effects of catoptric light.

A lens barrel according to a first aspect of the present invention comprises a barrel holding an optical system, and a barrel-side mount fitting said barrel on a photographic device having an imaging unit, wherein said imaging unit takes an image formed on a rectangular imaging plane by said optical system, and said barrel-side mount is placed in the position to avoid corners of said rectangular imaging plane.

A lens barrel according to a second aspect of the present invention comprises a barrel holding an optical system, a barrel-side mount to fit said barrel to a photographic device, and two or more barrel-side electric contact groups, wherein said photographic device comprises an imaging unit to take an image, number of said barrel-side mounts are present, and each of said barrel-side electric contact groups includes two or more electric contact points and is placed with a space between each other barrel-side electric contact groups.

A lens barrel according to a third aspect of the present invention comprises a barrel holding an optical system, a barrel-side mount to fit said barrel to a photographic device, and two or more barrel-side electric contact points, wherein said photographic device comprises an imaging unit to take an image, and said barrel-side mount is placed between said barrel-side electric contact points.

A lens barrel according to a forth aspect of the present invention comprises a barrel-side fitting unit placed detachably-attached to a body-side fitting unit of a camera body having a photographic region, and a barrel-side mount projection, which is formed at more than one point along the circumferential direction of said barrel-side fitting unit, set in opening site of said body-side fitting unit and engaged with a body-side mount projection formed at more than one point along the circumferential direction of said body-side fitting unit to prevent from releasing, wherein at least said barrel-side mount projection is formed on said barrel-side fitting unit to avoid cross-section of light path area where object light is introduced in said camera body.

A lens barrel according to a fifth aspect of the present invention comprises a bayonet unit arranged to a camera body having a photographic region to retain, wherein said bayonet unit is arranged to avoid light flux entering in said photographic region among light flux going to the side of said photographic region.

A photographic device according to a first aspect of the present invention comprises an imaging unit to take an image formed on a rectangular imaging plane by an optical system, and a photographic device-side mount to fit a lens barrel to said photographic device, wherein said lens barrel has said optical system, and said photographic device-side mount is placed to avoid corners of said rectangular imaging plane.

A photographic device according to a second aspect of the present invention comprises an imaging unit to take an image by an optical system, a photographic device-side mount to fit a lens barrel to said photographic device, and two or more photographic device-side electric contact groups, wherein said lens barrel has an optical system to form an image on said imaging plane, each of said electric contact groups has two or more contact points, and is placed with a space between each other photographic device-side electric contact groups.

A photographic device according to a third aspect of the present invention comprises an imaging unit to take an image by an optical system, a photographic device-side mount to fit a lens barrel to the photographic device, and two or more photographic device-side electric contact points, wherein said lens barrel has said optical system to form an image on said imaging plane, and said photographic device-side mount is placed between said photographic device-side electric contact points.

A production method of the lens barrel according to a first aspect of the present invention comprises the steps of:

providing a barrel holding an optical system, and providing a barrel-side mount that fits a photographic device to said barrel, wherein said photographic device comprises an imaging unit, said imaging unit comprises a rectangular imaging plane, said imaging unit takes an image formed on said rectangular imaging plane by said optical system, and said barrel-side mount is placed to avoid corners of said rectangular imaging plane.

A production method of the lens barrel according to a second aspect of the present invention comprises the steps of:

providing a barrel holding an optical system, providing multiple barrel-side mounts on said barrel to fit a photographic device having an imaging unit to take an image formed by said optical system, and providing two or more barrel-side electric contact groups, each of which is placed with a space between each other and has two or more barrel-side electric contact points.

A production method of the lens barrel according to a third aspect of the present invention comprises the steps of:

providing a barrel holding an optical system, providing a barrel-side mount on said barrel to fit a photographic device having an imaging unit to take an image formed by said optical system, and providing two or more barrel-side electric contact points, said barrel-side mount being placed between said barrel-side electric contact points.

A production method of the photographic device according to the first aspect of the present invention comprises the steps of:

providing an imaging unit having a rectangular imaging plane to take an image formed on said rectangular imaging plane by an optical system, and providing a photographic device-side mount to fit a lens barrel to the position to avoid corners of said rectangular imaging plane.

A production method of the photographic device according to the second aspect of the present invention comprises the steps of:

providing an imaging unit to take an image formed by an optical system, providing multiple photographic device-side mounts to fit a lens barrel, and providing two or more photographic device-side electric contact groups, each of which is placed with a space between each other and has two or more electric contact points.

A production method of the photographic device according to the third aspect of the present invention comprises the steps of:

providing an imaging unit to take an image formed by an optical system, providing a photographic device-side mount to fit a lens barrel, and providing two or more photographic device-side electric contact points, said photographic device-side mount being placed between said photographic device-side electric contact points.

A camera body according to the present invention comprises a photographic region, a mirror box to introduce subject light through light path area having predetermined cross-section to said photographic region, and a body-side fitting unit to detachably attached to a barrel-side fitting unit of a lens barrel, wherein a body-side mount projection to engage with said barrel-side mount projection formed at least on a part of the circumferential direction of opening site where a mount projection of said lens barrel is introduced in said body-side fitting unit, and said body-side mount projection is formed to avoid the cross-section of said light path area.

A camera system according to the present invention comprises the above lens barrel.

The present invention can provide a lens barrel enabling to reduce effects of catoptric light and a camera system including said lens barrel. In the present invention, an object to reduce effects of catoptric light is achieved by changing the arranged position or the size of bayonet mount projections.

BRIEF DESCRIPTION OF THE DRAWINGS

Below, the present invention will be explained in detail based on the embodiments illustrated in the figures, wherein

FIG. 3 is a cross-sectional view of the principal parts along an optical axis showing the inside of the camera body in FIG. 2 where the lens barrel in FIG. 1 is fitted, and a cross-sectional view of line III shown in FIG. 4A.

DESCRIPTION OF THE PREFERRED EMBODIMENTS

First Embodiment

Figure 1:
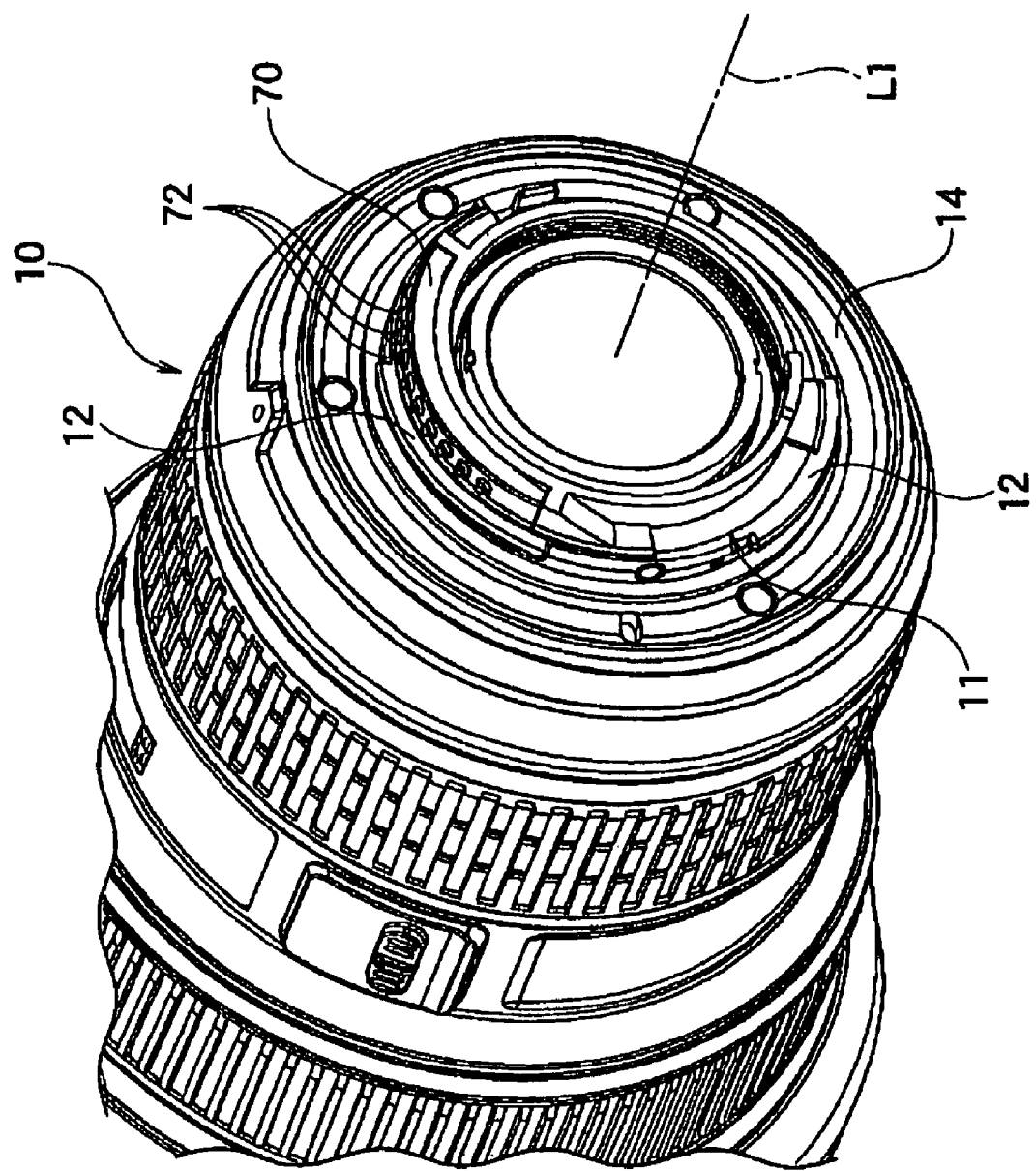
FIG. 1 is a perspective view of a lens barrel of an embodiment of the present invention.
Figure 2:
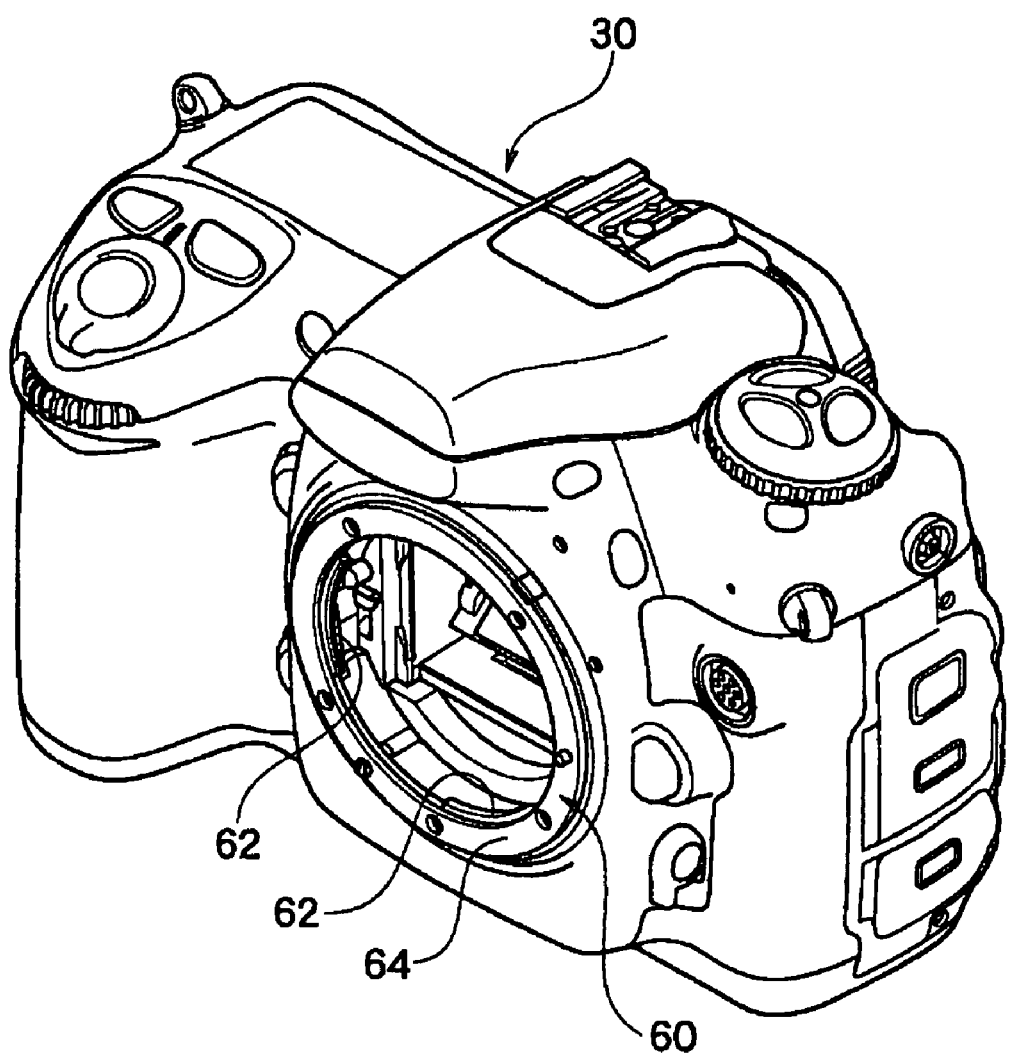
FIG. 2 is a perspective view of a camera body of an embodiment of the present invention.

As shown in FIG. 1 and FIG. 2, a lens barrel-type imaging equipment represented by single-lens reflex camera typically includes a lens barrel 10 and a camera body 30. A lens barrel-side fitting part 11 held on the back of the lens barrel 10 is detachably attached to a body-side fitting part 60 held on the front of the camera body 30.

To the inside of a barrel body of a lens barrel 10 shown in FIG. 1, multiple optical lens groups (not shown in the figure) are attached movably in the direction of an optical axis. As shown in FIG. 3, a camera body 30 holds a low-pass filter 31 and an imaging device 32. The imaging device 32 includes magnifying-type solid-state image sensing devices such as CMOS other than CCD.

A reason to provide a low-pass filter 31 is following. In the imaging device 32 of the camera body 30, a phenomenon called a false color or a color moire can occur resulting in a different coloring from an actual one when a light with high spatial frequency enters in a single pixel of the imaging device 32. This phenomenon can be reduced by setting the low-pass filter 31 at an object side of the imaging device 32.

As shown in FIG. 3, to the inside of the camera body 30, a mirror box 40 is attached at a predetermined position relative to body frames 30a and 30b of the body 30. The imaging device 32 and the low-pass filter 31 are attached to the body frame 30b at a predetermined position. Note that a body frame 30c is attached to the back of the imaging device 32.

A mirror not shown in figures is placed in the mirror box 40, which leads an object light entering parallel to an optical axis in the direction of a finder when not taking pictures; and which leads an object light in the direction of the imaging device 32 by moving the mirror when taking pictures.

Figure 4A:
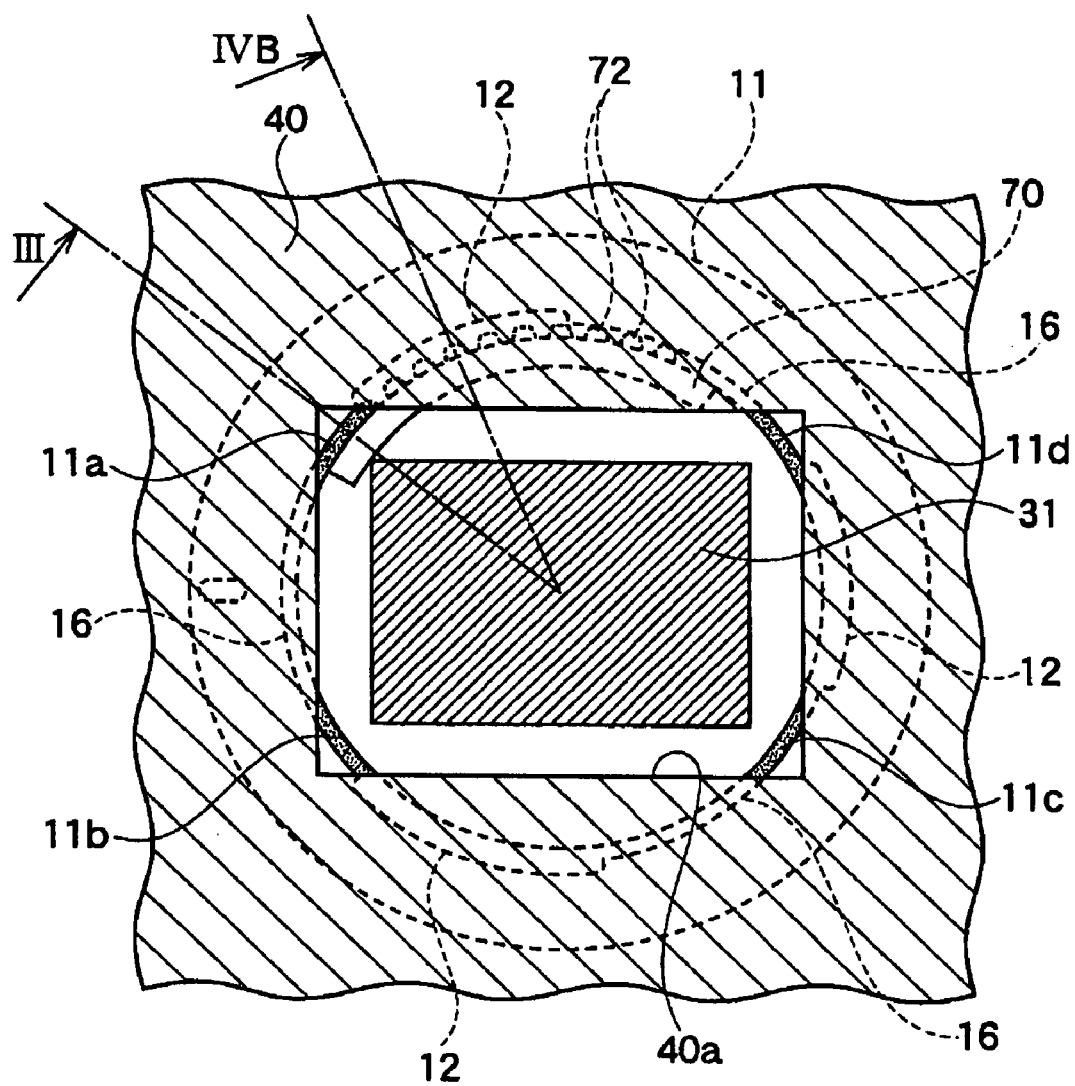
FIG. 4A is a cross-sectional view of the principal parts along line IVA-IVA in FIG. 3.

As shown in FIG. 4A, the imaging device 31 is rectangular in shape when viewing vertically from an optical axis L1, which is smaller than a rectangular cross-section of an inner opening site 40a of the mirror box 40. A cross section of an inner opening site of a body frame 30b shown in FIG. 3 is rectangular as well as that of the inner opening site 40a of the mirror box 40. On the other hand, a cross-section of an inner opening site of a body frame 30a positioned at the object side in the direction of the optical axis L1 of the mirror box 40 is circular. To the front of the body frame 30a, a ring-shaped body-side fitting part 60 is attached.

Figure 4B:
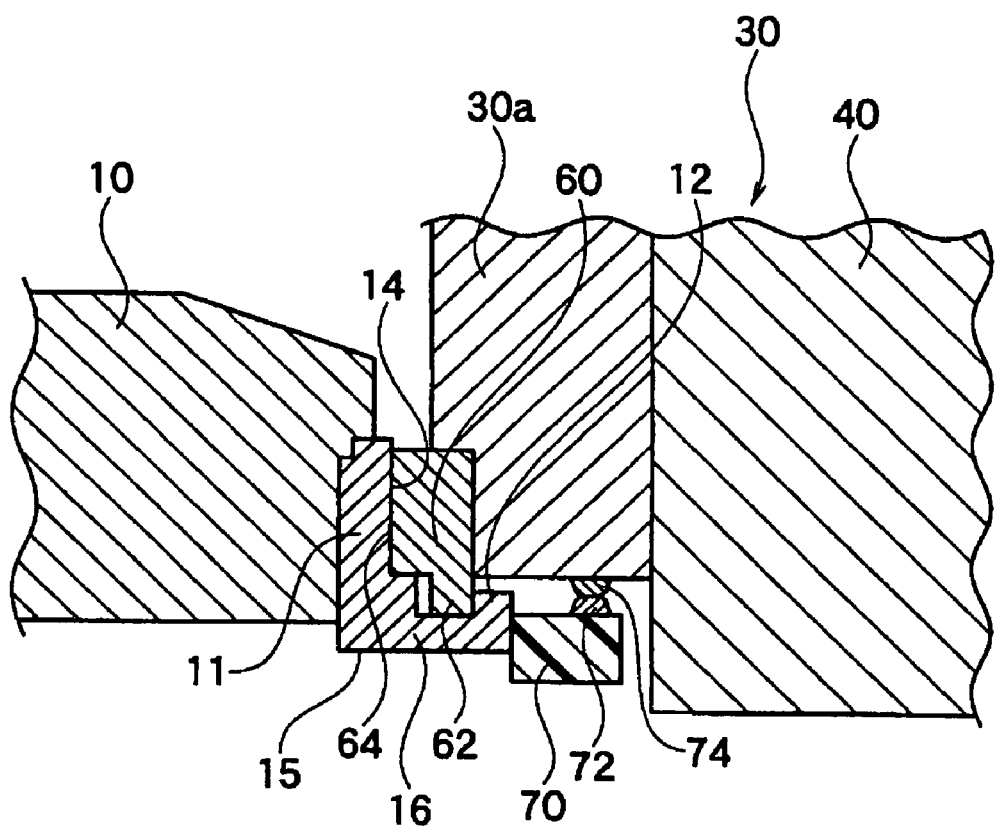
FIG. 4B is a cross-sectional view of the principal parts along line IVB-IVB in FIG. 4A.

As shown in FIG. 1 and FIG. 4b, the barrel-side fitting part 11 held on the back of the lens barrel 10 is ring-shaped in the whole to accommodate the shape of the lens barrel 10. On the barrel-side fitting part 11, a barrel-side fitting plane 14 is formed substantially vertical to an optical axis L1 of an optical lens group. The barrel-side fitting plane 14 can be attached tightly to a body-side fitting plane 64 formed on a body-side fitting part 60 of a camera body 30. The body-side fitting plane 64 is also substantially vertical to the optical axis L1 of the optical lens group.

Both of the barrel-side fitting part 11 and the body-side fitting part 60 are made of metal, and can be detachably attached in the so-called style of a bayonet mount. That is, as shown in FIG. 4A, three barrel-side mount projections 12 are formed at unequal intervals in the circumferential direction on the imaging surface side in the direction of the optical axis in the barrel-side fitting part 11.

As shown in FIG. 4B, barrel-side mount projections 12 are extended out radially from a cylindrical inner circumference face 15 of the barrel-side fitting part 11. Three barrel-side mount projections 12 arranged along the circumference as shown in FIG. 4A are connected in the circumferential direction by a cylindrical stiffened member 16. The radial thickness of the cylindrical stiffened member 16 is approximately a half or smaller of the radial width of the mount projections 12.

As shown in FIG. 2 and FIG. 4B, body-side mount projections 62 are formed on the inner circumference face of the body-side fitting part 60 at the position corresponding to the barrel-side mount projections 12 at unequal intervals in the circumferential direction. The inner diameter of the body-side mount projection 62 is equal to or slightly larger than the outer diameter of the cylindrical stiffened member 16. The outer diameter of the barrel-side mount projection 12 is slightly smaller than the inner diameter of the body-side fitting part 60 without body-side mount projections 62.

The lens barrel 10 in FIG. 1 is fitted to the camera body 30 in FIG. 2 as follows: the mount projections 12 in the barrel-side fitting part 11 shown in FIG. 1 are pressed into the inside of the body-side fitting part 60 at the position in the circumferential direction where body-side mount projections 62 shown FIG. 2 are not formed.

After that, the lens barrel 10 is rotated around the optical axis L1 to put the mount projections 12 of the barrel-side fitting part 11 in the imaging surface side of the body-side mount projections 62 of the body-side fitting part 60 where the lens barrel 10 is fitted to the camera body 30 in the bayonet-type.

As shown in FIG. 4A and FIG. 4B, a circular-shaped electric contact holding member 70 is fixed on the imaging surface sides in the direction of the optical axis of the cylindrical stiffened member 16 of the barrel-side fitting part 11 and the mount projections 12. The electric contact holding member 70 is comprised of an insulating member such as plastic, and two or more barrel-side electric contact points 72 may be placed on the outer circumferential face of the holding member 70 for example. These barrel-side electric contact points 72 are detachably connected by rotation to each body-side electric contact point 74 placed on the inner circumferential face of a body frame 30a.

In the present embodiment, the electric contact holding member 70 is fixed at the barrel-side fitting part 11 as shown in FIG. 4 so that the most of the holding member 70 is above the upper long side of an inner opening site 40a with a rectangular cross-section in the mirror box 40. When fixing the electric contact holding member 70 at the barrel-side fitting part 11, at least barrel-side electric contact points 72 has to be placed above the upper long side of the inner opening site 40a with a rectangular cross-section.

Further, as shown in FIG. 4A, three barrel-side mount projections 12 are placed at unequal intervals in the circumferential direction so as to satisfy the following relationship: one of three barrel-side mount projections 12 is above (outside) the upper long side of the inner opening site 40a with a rectangular cross-section, another mount projection 12 is outside the right short side of the inner opening site 40a, and the last mount projection 12 is below (outside) the lower long side of the inner opening site 40a. It means that the mount projections 12 placed on the lens barrel 10 are not exposed at four corners 11a, 11b, 11c and 11d of the opening site 40a where only the cylindrical stiffened member 16 is exposed.

Note that the arranging position in the circumferential direction of the body-side mount projection 62, which forms a bayonet structure in pairs with the barrel-side mount projection 12, is same as that of the barrel-side mount projection 12.

Figure 5:
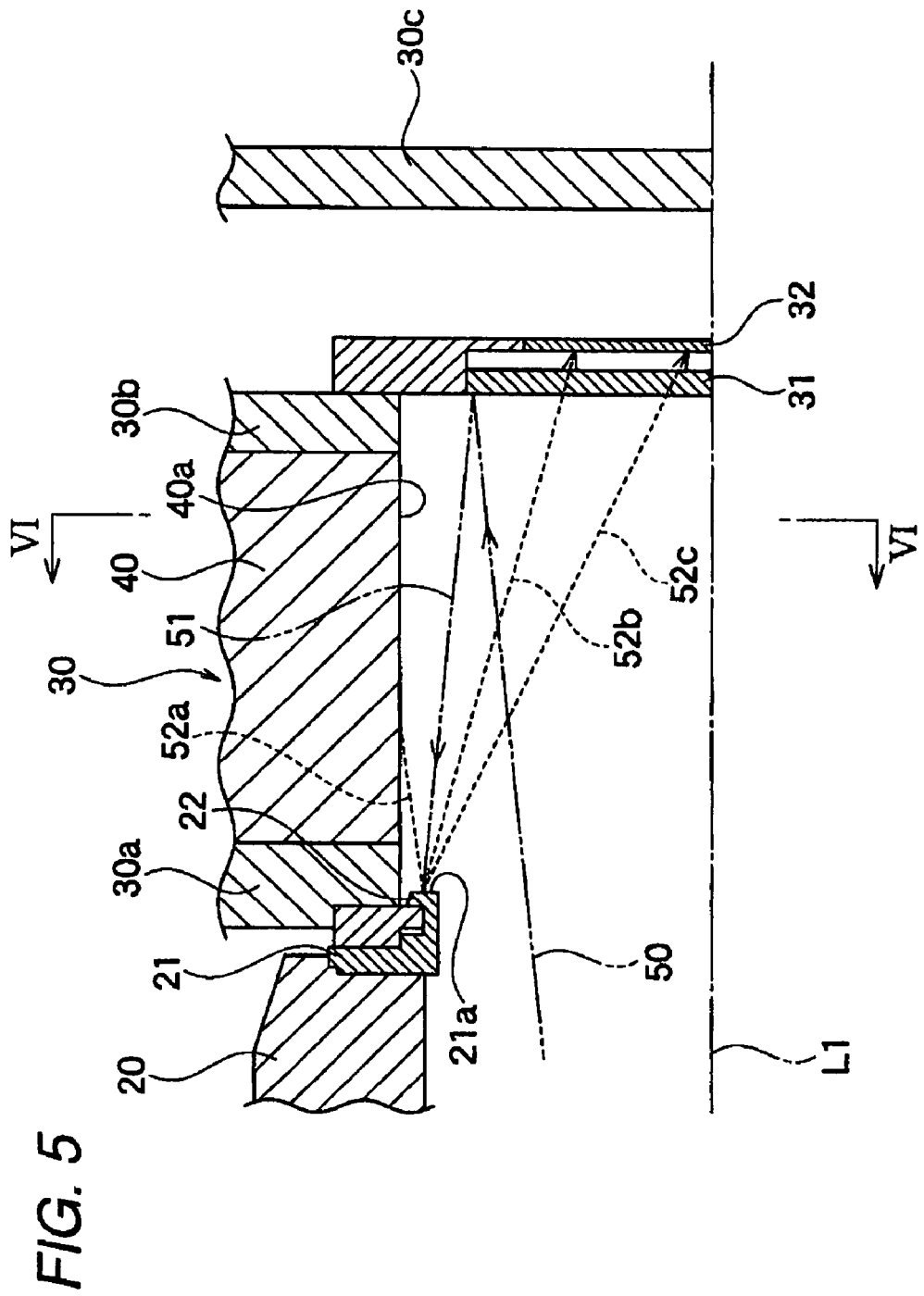
FIG. 5 is a cross-sectional view of the principal parts along an optical axis showing the inside of the camera body where a lens barrel according to a comparative example of the present invention is fitted, and a cross-sectional view of line V in FIG. 6.
Figure 6:
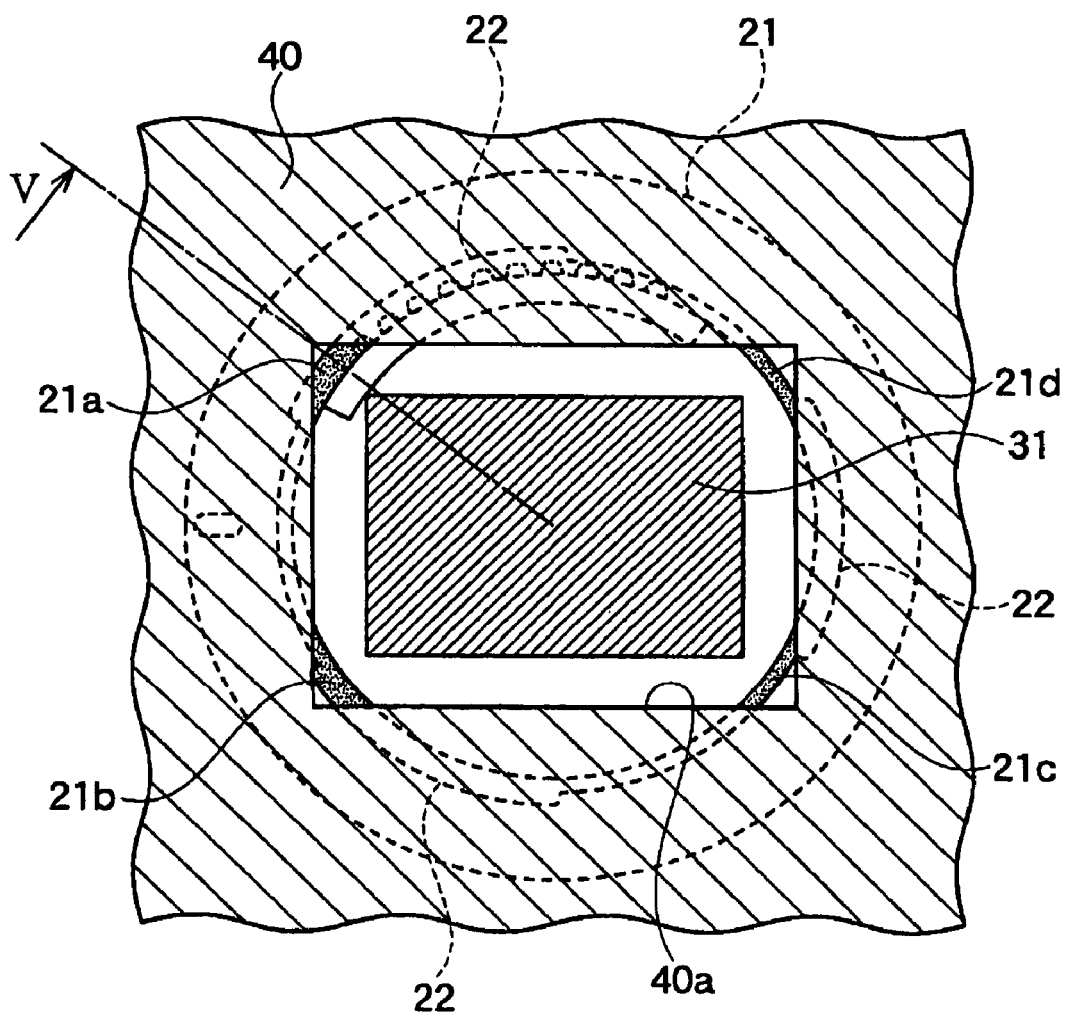
FIG. 6 is a cross-sectional view of the principal parts along line VI-VI in FIG. 5.

As shown in FIG. 5 and FIG. 6, in a lens barrel 20 according to a comparative example of the invention, three barrel-side mount projections 22 are placed at equal intervals on the barrel-side fitting part 21 regardless of the shape of the cross-section of the inner opening site 40a in the mirror box 40. Therefore, as shown in FIG. 6, a part of the mount projection 22 placed on the lens barrel 20 is exposed at four corners 21a, 21b, 21c and 21d of the opening site 40a when viewing the direction of the lens barrel 20 from a low-pass filter 31. The mount projections 22 are exposed at two of the four corners, 21a and 21b, and the exposed area is large.

The light 50 passing through the inside of the lens barrel 20 can pass through the low-pass filter 31 to enter an imaging device 32, or can be reflected on the face of the low-pass filter 31 instead of passing through it.

Usually, this catoptric light hits the inner surface of the camera body 30 or the lens barrel 20, diffuse to fade, or be absorbed, but in rare cases, it can enter the imaging device 32 after reflecting again on the end face of the bayonet-type mount projection 22 placed on the lens barrel 20. This second catoptric light can hit at the inner surface of the camera body 30 if reflecting regularly on the end face of the bayonet-type mount projection 22, but actually, it rarely reflects regularly since there is microasperity on the end face of the mount projection 22 due to machine process.

When the second catoptric light 52b and 52c enter the imaging device 32, it is possible to become a ghost or a flare to deteriorate picture quality. Note that the light ray 50 can reflect on the imaging device 32, and also in the case of a silver salt film camera, on the surface of the film. In the end face in the optical axis direction of the barrel-side fitting part 21, the projection 22 has a broader width in the radial direction, where more catoptric light may hit to easily increase ghosts and flare.

Therefore, in the present embodiment, the above-described configurations of the bayonet-type mount projections 12 and 62 solve the above problems. Hereinbelow, the arranged position of the mount projections 12 will be explained. An explanation on the mount projections 62 will be skipped since they have the same arranged position as the mount projections 12.

Figure 4C:
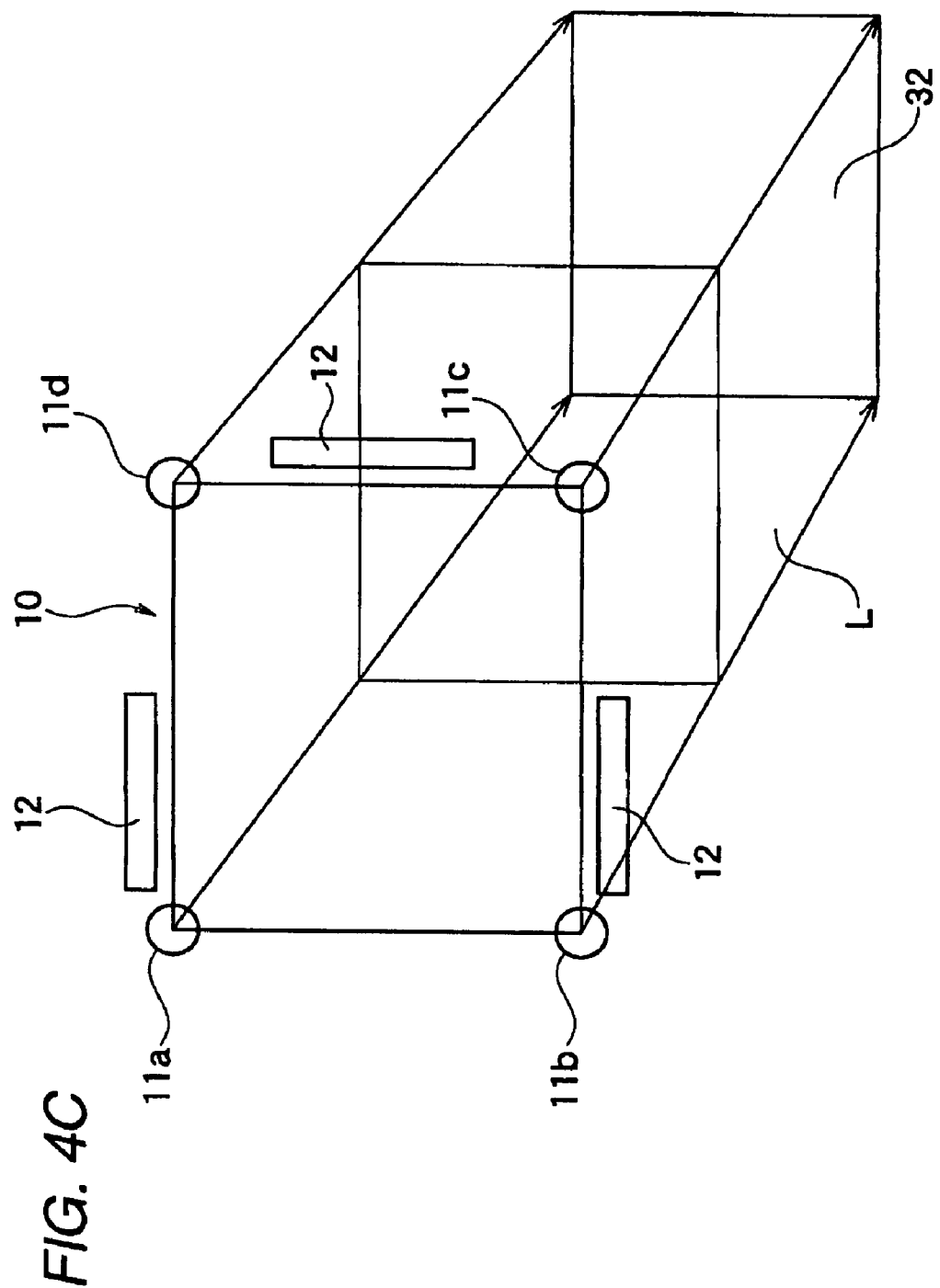
FIG. 4C is a view showing a frame format of a lens barrel and an imaging device, and an arranged position of mount projections.

As shown in FIG. 4C, the mount projections 12 are arranged to avoid the vicinity of four corners 11a, 11b, 11c and 11d of a light flux L with a rectangular cross-section that goes from the lens barrel 10 to enter the imaging device 32. Actually as shown in FIG. 4A, the mount projections 12 are arranged not to overlap four corners of the opening site 40a. Therefore, the mount projections 12 are not on the diagonal line of the low-pass filter 31, and not exposed on the inside of the opening site 40a.

When viewing the lens barrel 10 from the low-pass filter 31, four portions of the barrel-side fitting part 11 placed on the lens barrel 10 are exposed at four corners 11a, 11b, 11c, and 11d of the opening site 40a as shown in FIG. 4A. However, the exposed area is small and the effect of the catoptric light is low since the exposed portions are not the mount projections 12.

As the mount projections 12 are not exposed on the inside of the opening site 40a, the catoptric light 51 from the low-pass filter 31 does not enter the mount projection 12 as shown in FIG. 3. Therefore, the effect of catoptric light to reflect on the mount projection 12 can be reduced to prevent flares and ghosts and to minimize image degradation.

Further, when the lens barrel 10 is a bright optical lens barrel with F value of 2.8 or less, a telephoto lens barrel, or a large diameter lens barrel for instance, light passes right next to the barrel-side fitting part 11 causing that the catoptric light easily affects, and therefore, it is meaningful to prevent the catoptric light from entering the mount projection 12. Also, the effects of the present embodiment are more significant when the distance between the imaging device and the mount projections are closer, e.g. when the imaging device is large (e.g. 24 mm×36 mm or larger), or when the diameters of the barrel-side fitting part 11 and the body-side fitting part 60 are small.

Also, a coating material is applied on components such as a lens holding rim inside the lens barrel 20 (See FIG. 5 and FIG. 6). However, the coating may peel off to adhere to the lens or the low-pass filter 31 if applying it on the exterior of the barrel-side fitting part 21 that is rubbed when fitting the lens barrel 20 and the camera body 30. It is also unfavorable to apply a coating only on the mount projection 22 to prevent reflection, which is a protruding portion and may be easily rubbed and pealed off while removing the lens barrel 20 from the camera body. However, in this embodiment, it is possible to obtain good characteristics as the configuration of the mount projections 12 and 62 prevents reflection instead of applying any coating.

Second Embodiment

Figure 7:
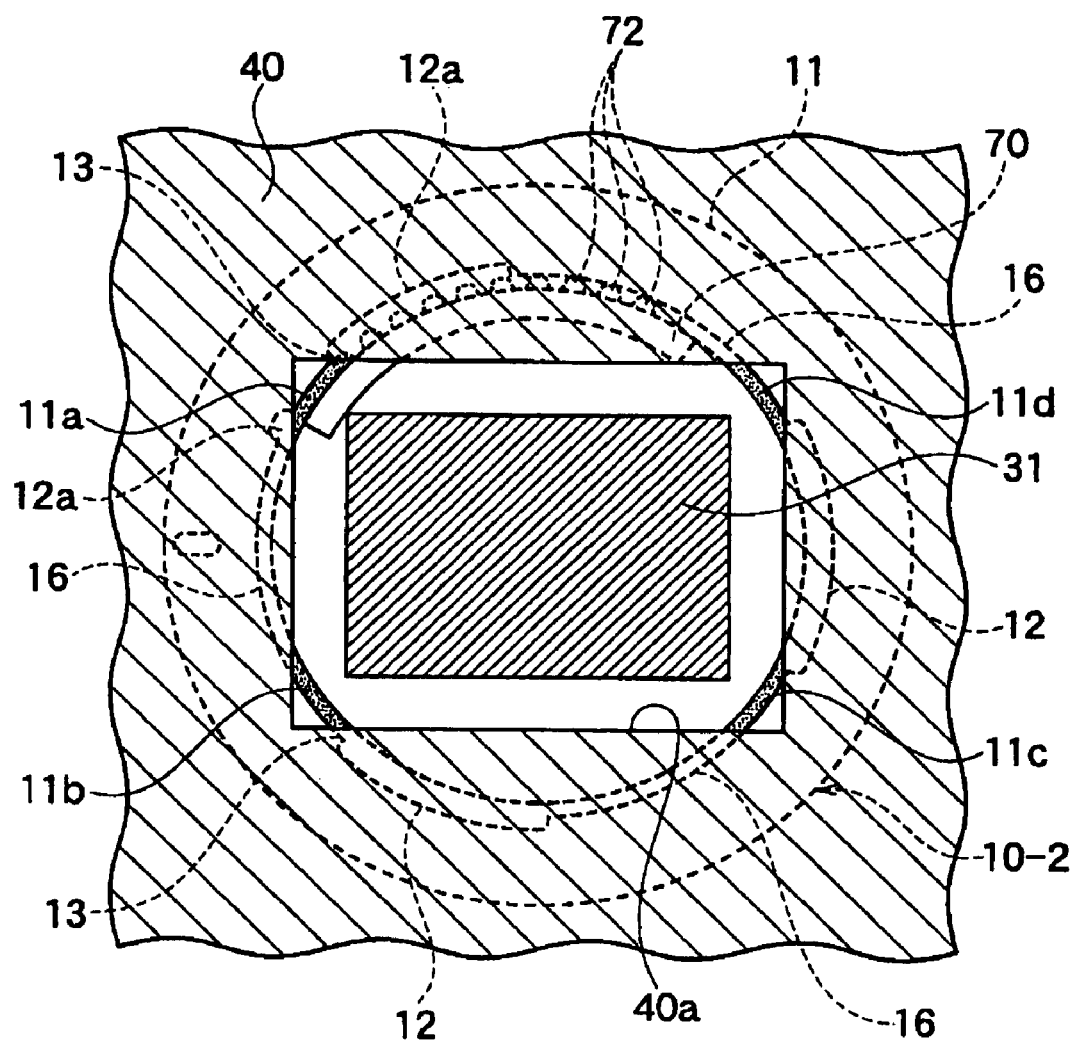
FIG. 7-FIG. 10 are cross-sectional views of the principal parts corresponding to FIG. 4A showing the inside of the camera body where each lens barrel according to other embodiments of the present invention is fitted.

As shown in FIG. 7, in a lens barrel 10-2 according to the second embodiment in the invention, the bayonet-type mount projection 12 has the same arranged position as the mount projection 22 according to the comparative example shown in FIG. 6. However, a notch 13 is formed on the mount projection 12a so as to avoid the inner opening site 40a of the mirror box 40 in the lens barrel 10-2 in the present embodiment.

The second embodiment has advantages that it is easy to design and unnecessary to change in basic configuration of a bayonet-type mount projection 62 of the camera body 30 since the mount projections 12 can be arranged at equal intervals in the circumferential direction. Other configuration and effects in the present embodiment is same as in the above-described first embodiment.

Third Embodiment

Figure 8:
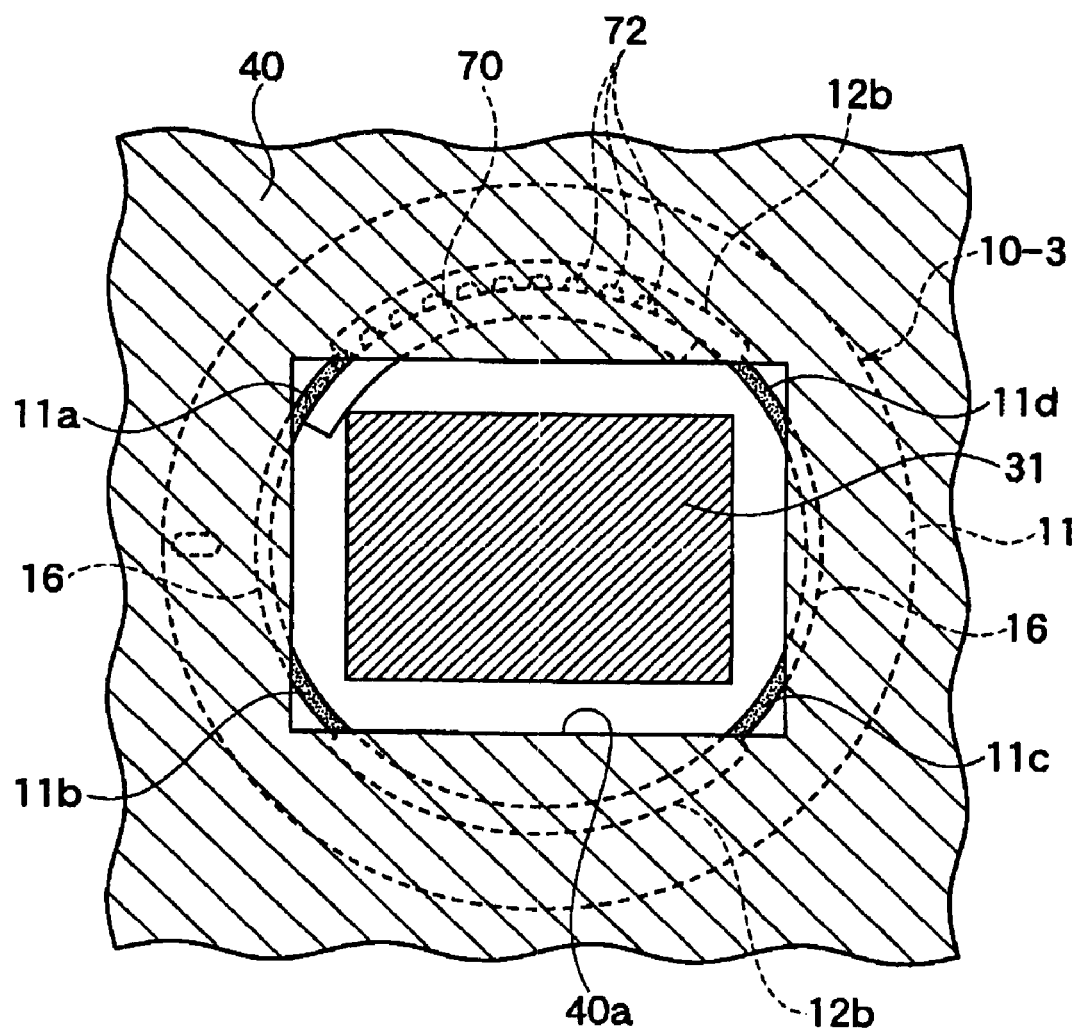

As shown in FIG. 8, in a lens barrel 10-3 according to the third embodiment, each of two mount projections 12b are arranged on outside of the long sides in a cross-section of the inner opening site 40a of the mirror box 40. This configuration results in no exposure of the mount projection 12b on the inside of the opening site 40a. Other configuration and effects in the present embodiment is same as in the above-described first embodiment.

Forth Embodiment

Figure 9:
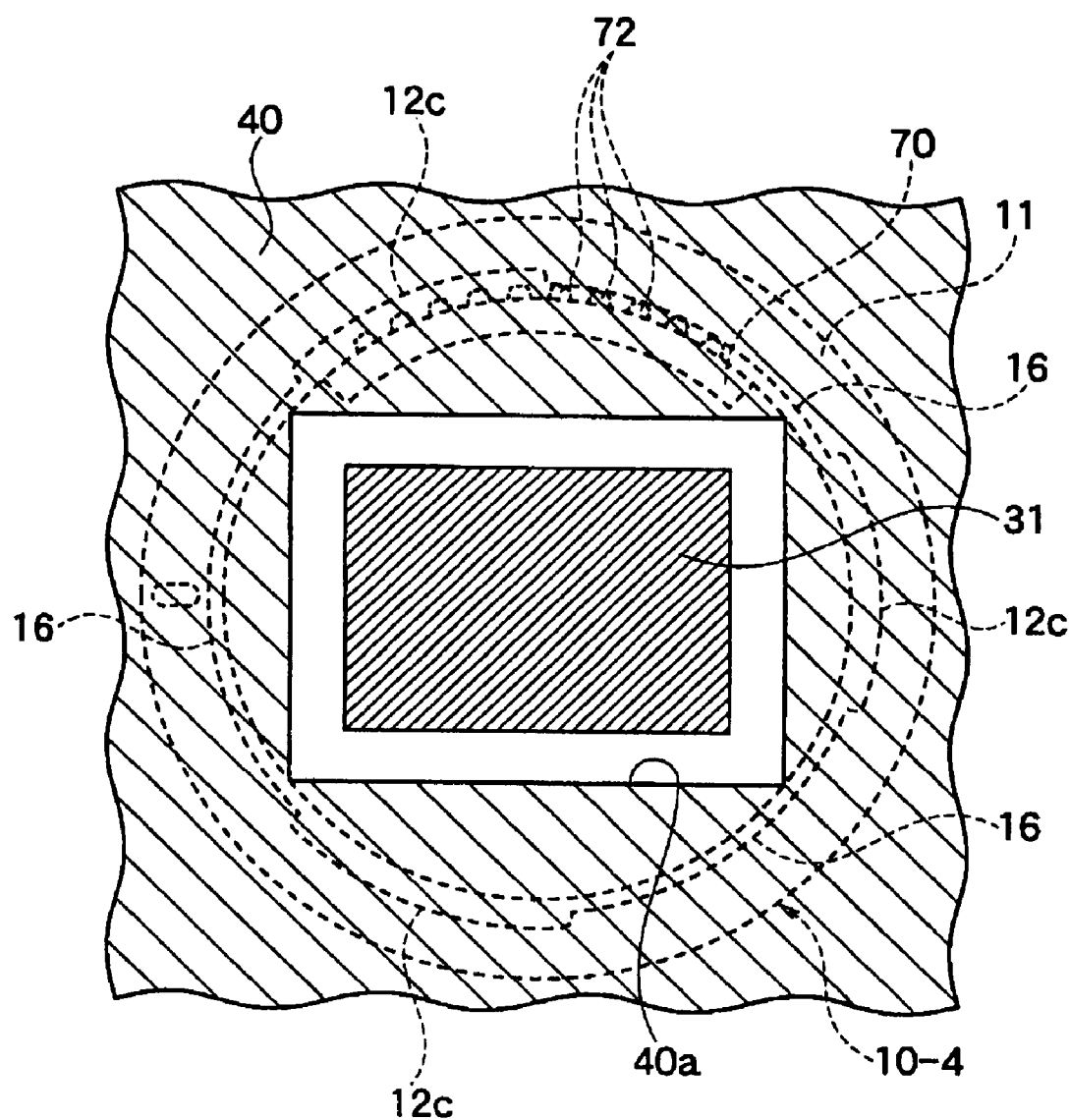

As shown in FIG. 9, in a lens barrel 10-4 according to the forth embodiment, the diameters of the inner circumferences of the barrel-side mount projection 12c and the cylindrical stiffened member 16 are designed equal to or longer than the length of the diagonal line of the inner opening site 40a of the mirror box 40. Also, both of a barrel-side mount projection 12c and a cylindrical stiffened member 16 are designed not to be exposed on the inside of the inner opening site 40a. Other configuration and effects in the present is same as in the above-described first embodiment.

Fifth Embodiment

Figure 10:
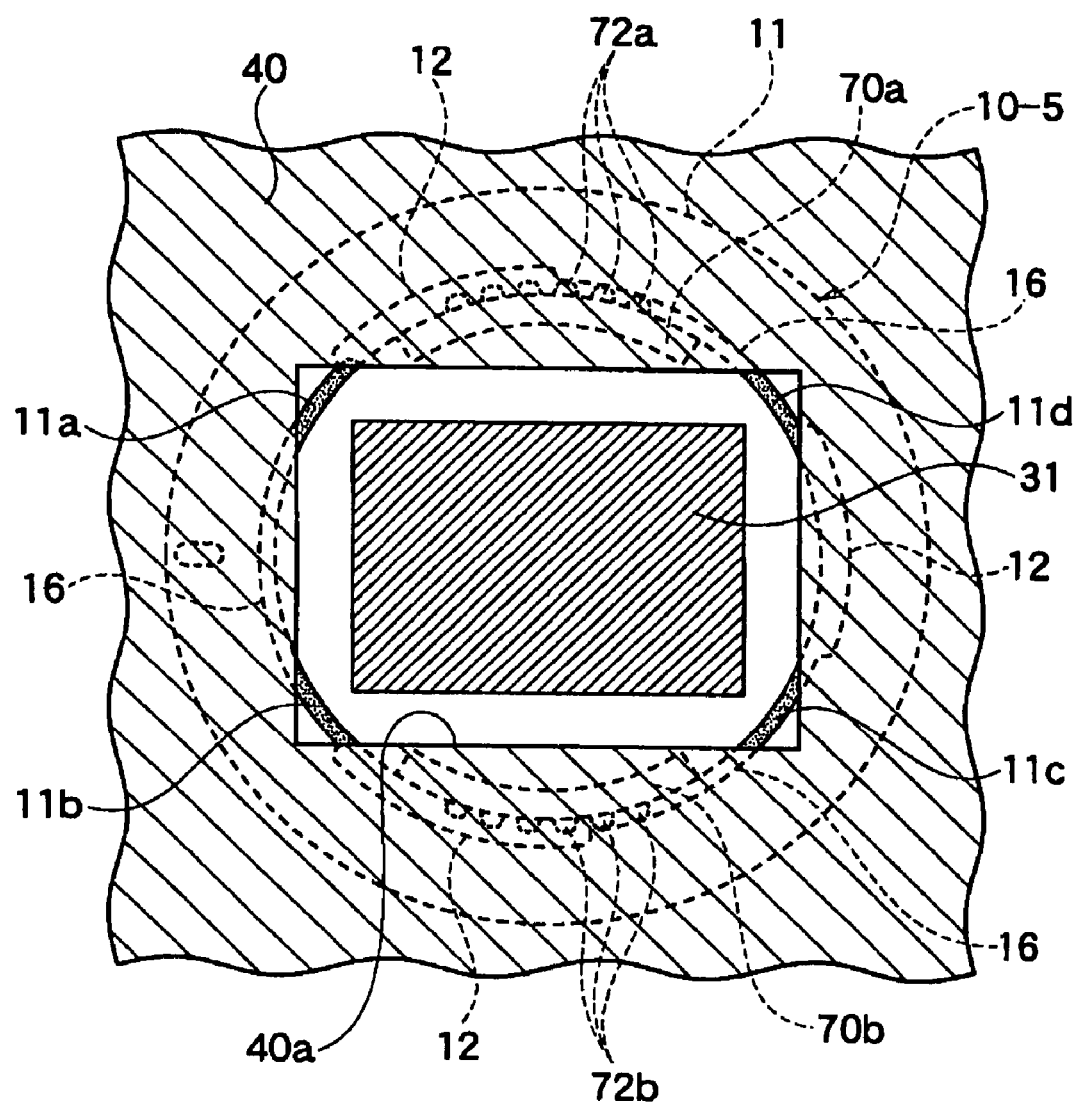

As shown in FIG. 10, in a lens barrel 10-5 according to the fifth embodiment, a barrel-side mount projection 12 is arranged similar to that in the first embodiment. Each of two electric contact holding members 70a and 70b is arranged on the outside of the long sides of the cross-section of the inner opening site 40a in the mirror box 40. The outer circumferences of electric contact holding members 70a and 70b have barrel-side electric contact groups 72a and 72b respectively.

In the present embodiment, the number of the contact points at each of the electric contact groups 72a and 72b placed on the each of the electric contact holding members 70a and 70b can be reduced since the electric contact groups 72a and 72b are divided into two to exchange signals between the-lens barrel 10-5 and the camera body. As a result, the length in the circumferential direction can be reduced in each electric contact group 72a and 72b, and they can be arranged in a smaller space. Further, it results in increasing the flexibility in design regarding the space between the electric contact groups 72a and 72b and becoming easier to arrange each of the electric contact holding members 70a and 70b to avoid the inner opening site 40a of the mirror box 40.

Further, the arrangement to separate the electric contact groups 72a and 72b each other reduces interference between contacts, resulting in improving S/N ratio. For example, an electromagnetic ray may easily occur at a contact point for electric power supply where relatively large electric current passes. It can reduce an electric signal noise at a contact point for signal to separate a contact point for electric power supply from that for signal. Other configuration and effects in the present embodiment is same as in the above-described first embodiment. Note that the electric contact holding member where electric contact groups are placed is divided into four so that each can be arranged at the outside of four lines of the inner opening part 40a of the mirror box 40 respectively.

Other Embodiments

The following conversion is possible in each embodiment.
(1) As shown in FIG. 4C, the mount projections 12 are described in the example to arrange all of them to avoid four corners 11a to 11d of the light flux L, but it is acceptable to arrange the mount projections 12 to avoid some of four corners 11a to 11d. In this case, effects of catoptric light can be reduced as well.

(2) In the embodiment shown in FIG. 8, the mount projections 12 are arranged above and below the opening site 40*a*, but it is acceptable to arrange them on the left and right of the opening site 40*a*. Also, four mount projections 12 can be arranged on the left, right, top and bottom of the opening site 40*a*. It is also acceptable to provide convexo-concave on the surface of the mount projections 12 for further prevention of reflection on the mount projections 12.

(3) Each embodiment described above is an example to apply the configuration of the present invention in a lens barrel, but it is also possible to apply the invention in a camera system holding such a lens barrel, a video camera, and a TV camera, and other imaging equipments.

Note that the above-described embodiments can be used in combination, but detailed explanation is omitted here. Also, the invention is not limited to the embodiments explained above.

What is claimed is:

1. A lens barrel comprising
a barrel holding an optical system,
a plurality of barrel-side mount projections fitting the barrel on a photographic device having a rectangular shaped imaging device and a rectangular shaped opening which is provided with the photographic device at a position nearer to an object side than the rectangular shaped imaging device and which introduces photographing light to said rectangular shaped imaging device, and
a cylindrical member holding the barrel-side mount projections provided along a circumferential direction of an optical axis, wherein
each side of the rectangular shaped opening is parallel to a corresponding side of the rectangle shaped imaging device,
said rectangular shaped imaging device is placed inside of the rectangular shaped opening when viewed along the optical axis direction,
each of the barrel-side mount projections is placed outside of the sides of the rectangular shaped opening to avoid corners of the rectangular shaped opening when viewed along the optical axis direction, and
the cylindrical member is placed inside the corners of the rectangular shaped opening when viewed along the optical axis direction.

2. The lens barrel as set forth in claim 1, wherein each of the barrel-side mount projections has a bayonet structure.

3. The lens barrel as set forth in claim 1, comprising
a barrel-side fitting plane placed parallel to said rectangular shaped imaging device, wherein
said barrel-side mount projections are arranged in a plane parallel to said barrel-side fitting plane.

4. The lens barrel as set forth in claim 1, wherein
said cylindrical member is arranged in the same plane as said barrel-side mount projections to reinforce said barrel-side mount projections.

5. The lens barrel as set forth in claim 4, wherein
said cylindrical member is placed between said barrel-side mount projections.

6. The lens barrel as set forth in claim 3, wherein
said barrel-side mount projections are placed between said barrel-side fitting planes and said rectangular shaped imaging device.

7. The lens barrel as set forth in claim 1, wherein
said optical system is placed close to an object side relative to said barrel-side mount.

8. The lens barrel as set forth in claim 1, further comprising
a low-pass filter provided at a position nearer to the object side than the rectangular shaped imaging device.

9. The lens barrel as set forth in claim 1, wherein
the barrel-side mount projections are provided at unequal intervals along the circumferential direction and are engaged with body-side mount projections of the photographic device.

10. A photographic device attached to the lens barrel as set forth in claim 1 comprising
a plurality of photographic device-side mount projections engaging with said barrel-side mount projections to fit said lens barrel to said photographic device, wherein
each of the photographic device-side mount projections is placed outside of sides of the rectangular shaped opening to avoid the corners of the rectangular shaped opening when viewed along the optical axis direction.

11. The photographic device as set forth in claim 10, wherein
a plurality of barrel-side mount projections are engaged with the plurality of photographic device-side mount projections.

12. A production method of a photographic device attached to the lens barrel as set forth in claim 1 comprising the steps of:
providing the rectangular shaped opening, and
providing photographic device-side mount projections outside of sides of the rectangular shaped opening to avoid the corners of said rectangular shaped opening when viewed along the optical axis direction.

13. A production method of a lens barrel comprising the steps of:
providing a barrel holding an optical system,
providing a plurality of barrel-side mount projections that fit the barrel on a photographic device having a rectangular shaped imaging device and a rectangular shaped opening which is provided with the photographic device at a position nearer to an object side than the rectangular shaped imaging device and which introduces photographing light to said rectangular shaped imaging device, and
providing a cylindrical member holding the barrel-side mount projections provided along a circumferential direction of an optical axis, wherein
each side of the rectangular shaped opening is parallel to a corresponding side of the rectangular shaped imaging device,
said rectangular shaped imaging device is placed inside of the rectangular shaped opening when viewed along the optical axis direction,
each of the barrel-side mount projections is placed outside of the sides of the rectangular shaped opening to avoid corners of the rectangular shape opening when viewed along the optical axis direction, and
the cylindrical member is placed inside of the corners of the rectangular shaped opening when viewed along the optical axis direction.

14. A lens barrel comprising
a barrel-side fitting unit placed detachably-attached to a body-side fitting unit of a camera body having a rectangular shaped photographic region and a rectangular shaped opening which is provided with the camera body at a position nearer to an object side than the rectangular shaped photographic region and which introduces photographing light to said rectangular shaped photographic region, and
a plurality of barrel-side mount projections, which are formed along a circumferential direction of the barrel-side fitting unit, set in opening site of said body-side fitting unit and engaged with a plurality of body-side mount projections formed along the circumferential direction of the body-side fitting unit to prevent releasing, wherein at least the barrel-side mount projections are formed on a cylindrical member of the barrel-side fitting unit along a circumferential direction of an optical axis, each side of the rectangular shaped opening is parallel to a corresponding side of the rectangular shaped photographic region, said rectangular shaped photographic region is placed inside of the rectangular shaped opening when viewed along the optical axis direction, each of the barrel-side mount projections is placed outside of sides of the rectangular shaped opening to avoid corners of the rectangular shaped opening when viewed along the optical axis direction, and the cylindrical member is placed inside of the corners of the rectangular shaped opening when viewed along the optical axis direction.

15. The lens barrel as set forth in claim 14, wherein a cross-section of a light path area is rectangular where subject light is introduced in said camera body.

16. A camera body attached to the lens barrel as set forth in claim 14, wherein each of the body-side mount projections is placed outside of sides of the rectangular shaped opening to avoid the corners of the rectangular shaped opening.

17. The camera body as set forth in claim 16, wherein a cross-section of a light path area is rectangular.

18. A lens barrel comprising a plurality of barrel-side mount projections having a bayonet structure engaged with a camera body having a rectangular shaped photographic region and a rectangular shaped opening which is provided with the camera body at a position nearer to an object side than the rectangular shaped photographic region and which introduces photographing light to said rectangular shaped photographic region, and a cylindrical member holding the barrel-side mount projections provided along a circumferential direction of an optical axis, wherein each side of the rectangular shaped opening is parallel to a corresponding side of the rectangular shaped photographic region, said rectangular shaped photographic region is placed inside of the rectangular shaped opening when viewed along the optical axis direction, each of the barrel-side mount projections is arranged outside of sides of the rectangular shaped photographic region to avoid corners of the rectangular shaped opening when viewed along the optical axis direction, and the cylindrical member is placed inside of the corners of the rectangular shaped opening when viewed along the optical axis direction.

19. The lens barrel as set forth in claim 18, wherein,
said barrel-side mount projections are located between said lens barrel and said rectangular shaped photographic region inserted into said camera, and arranged to avoid corners of a rectangular opening site of an area to block light other than photographing light.

20. The lens barrel as set forth in claim 18, wherein,
two of said barrel-side mount projections are arranged facing each other relative to the optical axis.

21. A camera system comprising the lens barrel as set forth in claim 18.

22. A lens barrel comprising:
a barrel holding an optical system,
a plurality of barrel-side mount projections fitting the barrel on a photographic device having a rectangular shaped imaging device and a rectangular shaped opening which is provided with the photographic device at a position nearer to an object side than the rectangular shaped imaging device and which introduces photographing light to said rectangular shaped imaging device, and a cylindrical member holding the barrel-side mount projections provided along a circumferential direction of an optical axis, wherein a radial thickness of the cylindrical member is shorter than that of the barrel-side mount projections, each side of the rectangular shaped opening is parallel to a corresponding side of the rectangular shaped imaging device, said rectangular shaped imaging device is placed inside of the rectangular shaped opening when viewed along the optical axis direction, each barrel-side mount projections is placed outside of the sides of the rectangular shaped opening to avoid corners of the rectangular shaped opening when viewed along the optical axis, and the cylindrical member is placed inside of the corners of the rectangular shaped opening when viewed along the optical axis.

23. The lens barrel as set forth in claim 22, wherein
the cylindrical member holds the barrel-side mount projections in the circumferential direction which is parallel to the rectangular shaped imaging device.

24. The lens barrel as set forth in claim 22, further comprising
a low-pass filter provide at a position nearer to the object side than the rectangular shaped imaging device.

25. The lens barrel as set forth in claim 22, wherein
the barrel-side mount projections project outward from the cylindrical member.

26. The lens barrel as set forth in claim 25, wherein
a radial thickness of the cylindrical member is shorter than that of the barrel-side mount projections.

* * * * *